US012005709B2

(12) United States Patent
Nakatani et al.

(10) Patent No.: US 12,005,709 B2
(45) Date of Patent: Jun. 11, 2024

(54) LIQUID DISCHARGING HEAD AND INK-JET APPARATUS

(71) Applicant: PANASONIC INTELLECTUAL PROPERTY MANAGEMENT CO., LTD., Osaka (JP)

(72) Inventors: Shuhei Nakatani, Osaka (JP); Kazunobu Irie, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/883,292

(22) Filed: Aug. 8, 2022

(65) Prior Publication Data

US 2022/0388308 A1 Dec. 8, 2022

Related U.S. Application Data

(63) Continuation of application No. 17/076,257, filed on Oct. 21, 2020, now Pat. No. 11,446,929.

(30) Foreign Application Priority Data

Oct. 29, 2019 (JP) ................................ 2019-196069
Jul. 17, 2020 (JP) ................................ 2020-122932

(51) Int. Cl.
*B41J 2/14* (2006.01)

(52) U.S. Cl.
CPC .. *B41J 2/14233* (2013.01); *B41J 2002/14241* (2013.01); *B41J 2202/03* (2013.01); *B41J 2202/11* (2013.01)

(58) Field of Classification Search
None
See application file for complete search history.

(56) References Cited

U.S. PATENT DOCUMENTS

| | | | | |
|---|---|---|---|---|
| 2002/0151171 | A1 | 10/2002 | Furusawa | |
| 2004/0125169 | A1 | 7/2004 | Nakagawa et al. | |
| 2006/0209138 | A1 | 9/2006 | Kachi | |
| 2007/0130740 | A1 * | 6/2007 | Mita | B41J 2/14233 29/25.35 |
| 2010/0026760 | A1 | 2/2010 | Matsuo | |

(Continued)

FOREIGN PATENT DOCUMENTS

| | | |
|---|---|---|
| JP | 2008-132651 | 6/2008 |
| JP | 2011-068095 A | 4/2011 |
| JP | 2019-6053 | 1/2019 |

*Primary Examiner* — Erica S Lin

(74) *Attorney, Agent, or Firm* — GREENBLUM & BERNSTEIN, P.L.C.

(57) ABSTRACT

A liquid discharging head includes a nozzle configured to discharge liquid, a pressure chamber communicated with the nozzle, and an individual channel communicated with the pressure chamber through a narrow part. The liquid discharging head also includes a common channel communicated with the individual channel, an energy generation element configured to generate energy, and a diaphragm configured to convey the energy to the pressure chamber. A metal oxide film is formed at inner walls of the nozzle, the pressure chamber, the narrow part, the diaphragm, and the individual channel, and a hydroxyl group has come out from the metal oxide film.

10 Claims, 8 Drawing Sheets

300

(56) References Cited

U.S. PATENT DOCUMENTS

| | | | | |
|---|---|---|---|---|
| 2013/0249062 | A1* | 9/2013 | Yoshimizu ........ | H01L 21/76837 257/637 |
| 2015/0091973 | A1* | 4/2015 | Ikoshi ........................ | B41J 2/01 523/205 |
| 2015/0267346 | A1 | 9/2015 | Kitamura | |

* cited by examiner

LIQUID DISCHARGING HEAD AND INK-JET APPARATUS

CROSS REFERENCE TO RELATED APPLICATIONS

This is a continuation application of U.S. application Ser. No. 17/076,257, filed Oct. 21, 2020, which claims the benefit of Japanese Patent Application No. 2019-196069, filed on Oct. 29, 2019, and Japanese Patent Application No. 2020-122932, filed on Jul. 17, 2020. The disclosure of each of the above-identified documents, including the specification, drawings, and claims, is incorporated herein by reference in its entirety.

TECHNICAL FIELD

The present disclosure relates to a liquid discharging head and an ink-jet apparatus.

BACKGROUND ART

In the related art, a drop-on-demand ink-jet head that can apply a desired amount of ink as required in accordance with an input signal is known as an example of a liquid discharging head. For example, in general, a drop-on-demand ink-jet head of piezoelectric type includes an ink supply channel, a plurality of pressure chambers connected to the ink supply channel and provided with a nozzle, and a piezoelectric element configured to apply a pressure to ink provided in the pressure chamber.

Here, an example of the bulk-type ink-jet head of the related art is described with reference to FIGS. 1A and 1B. FIGS. 1A and 1B are schematic views illustrating a cross-sectional structure of a bulk-type ink-jet head of the related art. FIG. 1A illustrates a state before voltage application, and FIG. 1B illustrates a state in voltage application.

As illustrated in FIGS. 1A and 1B, the bulk-type ink-jet head of the related art includes a plurality of nozzles 100 configured to discharge ink droplet, pressure chamber 110 communicated with nozzles 100 and provided with ink, partition wall 111 interposed between pressure chambers 110 corresponding to adjacent nozzles 100, diaphragm 112 as a part of pressure chamber 110, piezoelectric element 130 configured to vibrate diaphragm 112, and piezoelectric member 140 configured to support piezoelectric element 130 and partition wall 111. In addition, although not illustrated in the drawings, the bulk-type ink-jet head of the related art includes a common electrode configured to apply voltage to piezoelectric element 130, and an ink introduction port.

Piezoelectric member 140 is obtained by dividing one piezoelectric member by dicing. Nozzle 100 has a diameter of 10 μm to 50 μm. Nozzles 100 are disposed side by side at an interval of 100 μm to 500 μm. 100 to 400 nozzles 100 are provided, for example.

The bulk-type ink-jet head of the related art having the above-mentioned configuration operates as follows.

When a voltage is applied across a common electrode (not illustrated) on the rear side of piezoelectric element 130 and piezoelectric element 130, piezoelectric element 130 deforms from the state illustrated in FIG. 1A to the state illustrated in FIG. 1B. To be more specific, in FIG. 1B, the lower portion of the second piezoelectric element 130 from the left deforms. In this manner, the volume of pressure chamber 110 decreases, and a pressure is applied to the ink in pressure chamber 110, and thus, the ink droplet (not illustrated) is discharged from nozzle 100.

An example of the bulk-type ink-jet head of the related art is described above.

Further, an ink-jet head is known that includes an ink inlet and an ink outlet and discharges ink while circulating the ink. An effect of the circulation of ink is described below.

The ink in the proximity of the nozzle is in contact with the atmosphere at all times. The contact area between the ink and the atmosphere is very small, and therefore evaporation of the solvent of the ink cannot be to ignored. When the solvent of the ink evaporates, the solid concentration of the ink increases. As a result, the viscosity of the ink increases, making it difficult to normally discharge the ink.

In view of this, by circulating the ink, the ink in the proximity of the nozzle can be replaced at all time, and the ink in the proximity of the nozzle can be maintained at a normal viscosity at all time. As a result, clogging of the nozzle can be suppressed, and normal discharging can be steadily performed.

Further, a thin-film type ink-jet head using a thin-film piezoelectric element is known. An example of the thin-film type ink-jet head is described below with reference to FIGS. 2A and 2B. FIGS. 2A and 2B are schematic views illustrating a cross-sectional structure of a thin-film type ink-jet head of the related art. FIG. 2A illustrates a state before voltage application, and FIG. 2B illustrates a state in voltage application.

As illustrated in FIGS. 2A and 2B, the thin-film type ink-jet head of the related art includes nozzle 200 configured to discharge ink droplets, pressure chamber 210 communicated with nozzle 200 and provided with the ink, diaphragm 212 serving as a part of pressure chamber 210, thin-film piezoelectric element 220 provided on the upper part of diaphragm 212 and configured to vibrate diaphragm 212, piezoelectric member 140 configured to support piezoelectric element 130 and partition wall 111, and common pressure chamber 230 configured to supply ink to pressure chamber 210.

The thin-film type ink-jet head of the related art having the above-mentioned configuration operates as follows.

When a voltage is applied to thin-film piezoelectric element 220, thin-film piezoelectric element 220 deforms from a state illustrated in FIG. 2A to a state illustrated in FIG. 2B. This deformation of thin-film piezoelectric element 220 reduces the volume of pressure chamber 210 and applies a pressure to the liquid in pressure chamber 210, and thus ink droplets (not illustrated) are discharged from nozzle 200.

An example of the thin-film type ink-jet head of the related art is described above.

In addition, for example, PTL 1 discloses an ink-jet head in which the surface of a nozzle is provided with ink repellency (liquid repellency) for suppressing adhesion of discharged ink, and the inner wall of the nozzle is ink-wettable (lyophilic) for the purpose of suppressing retention of bubbles in the ink.

Here, a processing step of providing a nozzle with liquid repellency or a lyophilic property disclosed in PTL 1 is described with reference to FIG. 3. FIG. 3 is a schematic cross-sectional view illustrating a processing step for a nozzle plate of the ink-jet head disclosed in PTL 1.

First, as illustrated in an upper diagram in FIG. 3, a hydrogen termination process (X) is provided to the surface of nozzle plate 60 and the inner wall of nozzle hole 51.

Next, as illustrated in a middle diagram in FIG. 3, light energy 61 is given to the surface of nozzle plate 60, and the surface of nozzle plate 60 is activated. Then, a raw material of a liquid repellent film is attached to the surface of nozzle plate 60, thereby providing a liquid repellency (Y) to the surface of nozzle plate 60.

Next, as illustrated in a lower diagram in FIG. 3, heat energy 62 is given to the inner wall of nozzle hole 51, and a raw material of a lyophilic film is attached to the inner wall of nozzle hole 51, thereby providing a lyophilic property (Z) to the inner wall of nozzle hole 51.

Through the above-described processing step, the surface of nozzle plate 60 has a liquid repellency, and thus adhesion of ink can be suppressed. In addition, the inner wall of nozzle hole 50 has a lyophilic property, and thus retention of bubbles can be suppressed.

CITATION LIST

Patent Literature

PTL 1

Japanese Patent Application Laid-Open No. 2011-68095

SUMMARY OF INVENTION

Technical Problem

In the ink-jet head disclosed in PTL 1, however, the lyophilic property is not guaranteed at ink-contact parts other than the nozzle (for example, the inner wall surfaces of the channel and the pressure chamber). Therefore, when ink containing a binder component or particles of an inorganic compound (hereinafter referred to as particles and the like) is used in the ink-jet head disclosed in PTL 1, the particles and binder component may adhere to the ink-contact part other than the nozzle, and may accumulate to cause clogging. In particular, the binder component is composed of an organic compound, and as such tends to adhere to the ink-contact part composed of a metal such as stainless-steel.

For example, to reduce escape of the pressure wave in the pressure chamber, a narrow part, which is a channel having a smaller width than an individual channel, is provided at a portion where the individual channel and the pressure chamber are communicated with each other in the channel of the ink-jet head. A large shear stress is exerted on the narrow part when ink flows therethrough. Consequently, the particles and the like in the ink tend to be condensed, and clogging tends to occur due to the particles and the like adhered to the wall surface of the channel.

In addition, the diaphragm oscillates at a high rate in accordance with the discharging frequency. For example, the diaphragm oscillates approximately 1000 to 50000 times in one second in accordance with the frequency of approximately 1 to 50 kHz. This oscillation becomes a cause of a shearing stress applied at a high rate to the ink. Consequently, the dispersion state of the particles in the ink may be impaired such that the particles are condensed, and such particles may adhere to the surface of the diaphragm.

An object of the present disclosure is to provide a liquid discharging head and an ink-jet apparatus that can achieve stable discharging over time by suppressing clogging of a nozzle due to particles and the like contained in liquid, and by suppressing adhesion of the particles to a channel and a diaphragm surface.

Solution to Problem

A liquid discharging head according to an aspect of the present disclosure includes a nozzle configured to discharge liquid; a pressure chamber communicated with the nozzle; an individual channel communicated with the pressure chamber through a narrow part; a common channel communicated with the individual channel; an energy generation element configured to generate energy; and a diaphragm configured to convey the energy to the pressure chamber, wherein a monomolecular film is formed at inner walls of the nozzle, the pressure chamber, the narrow part, the diaphragm, and the individual channel, the monomolecular film being lyophilic to the liquid.

An ink-jet apparatus according to an aspect of the present disclosure includes the above-mentioned liquid discharging head; a drive controlling part configured to generate a drive voltage signal applied to the energy generation element and to control an ink discharging operation of the liquid discharging head; and a conveying part configured to cause a relative movement of the liquid discharging head and a paint target medium.

Advantageous Effects of Invention

According to the present disclosure, clogging due to particles and the like contained in liquid can be suppressed, and stable discharging over time can be achieved.

DESCRIPTION OF EMBODIMENTS

Figure 1A:
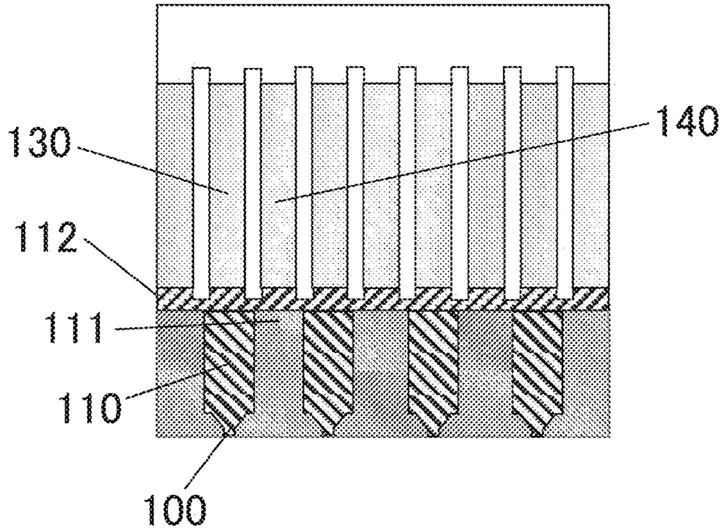
FIG. 1A is a schematic cross-sectional view illustrating a state before voltage application in a bulk-type ink-jet head of the related art.
Figure 1B:
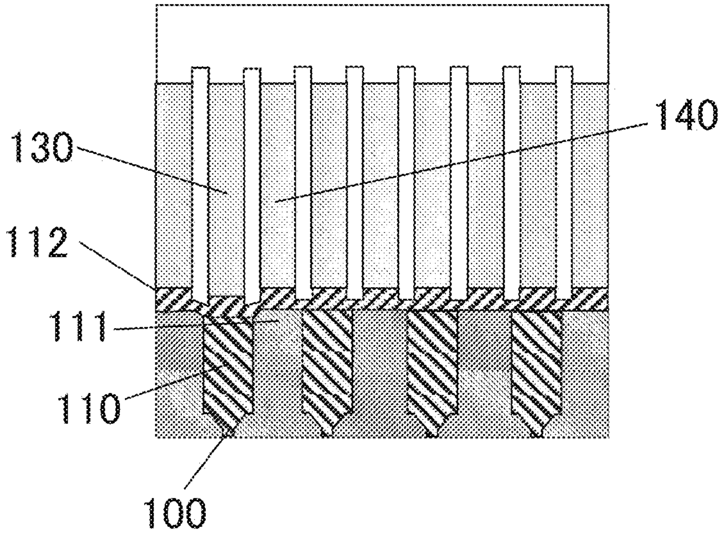
FIG. 1B is a schematic cross-sectional view illustrating a state in voltage application in the bulk-type ink-jet head of the related art.
Figure 2A:
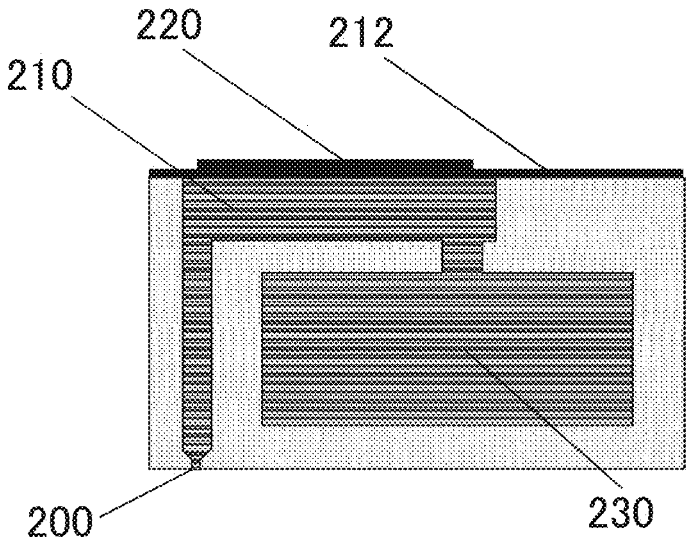
FIG. 2A is a schematic cross-sectional view illustrating a state before voltage application in a thin-film type ink-jet head of the related art.
Figure 2B:
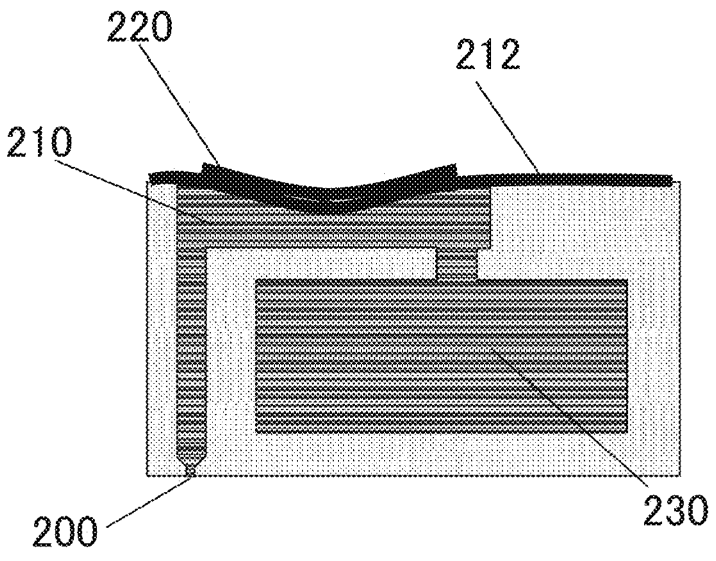
FIG. 2B is a schematic cross-sectional view illustrating a state in voltage application in the thin-film type ink-jet head of the related art.
Figure 3:
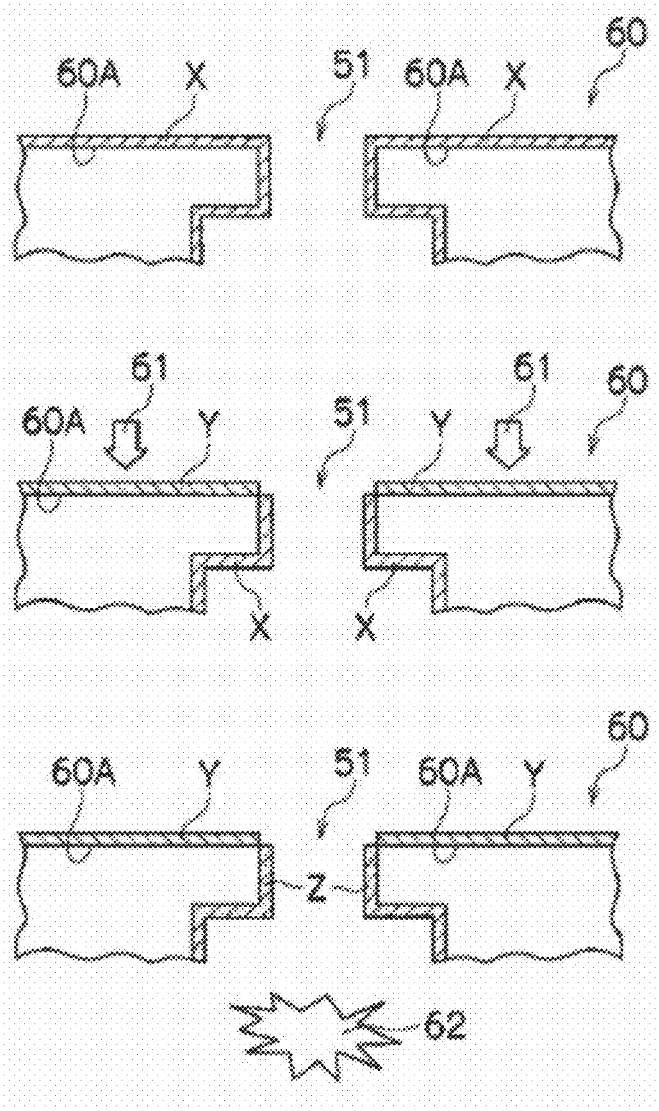
FIG. 3 is a schematic cross-sectional view illustrating a processing step of a nozzle plate of an ink-jet head disclosed in PTL 1.

An embodiment of the present disclosure is described below with reference to the drawings. Note that the same components in the drawings are denoted with the same reference numerals, and description thereof is appropriately omitted.

Ink-Jet Head 300

A configuration of ink-jet head 300 according to the embodiment of the present disclosure is described with reference to FIGS. 4A to 4C.

Figure 4A:
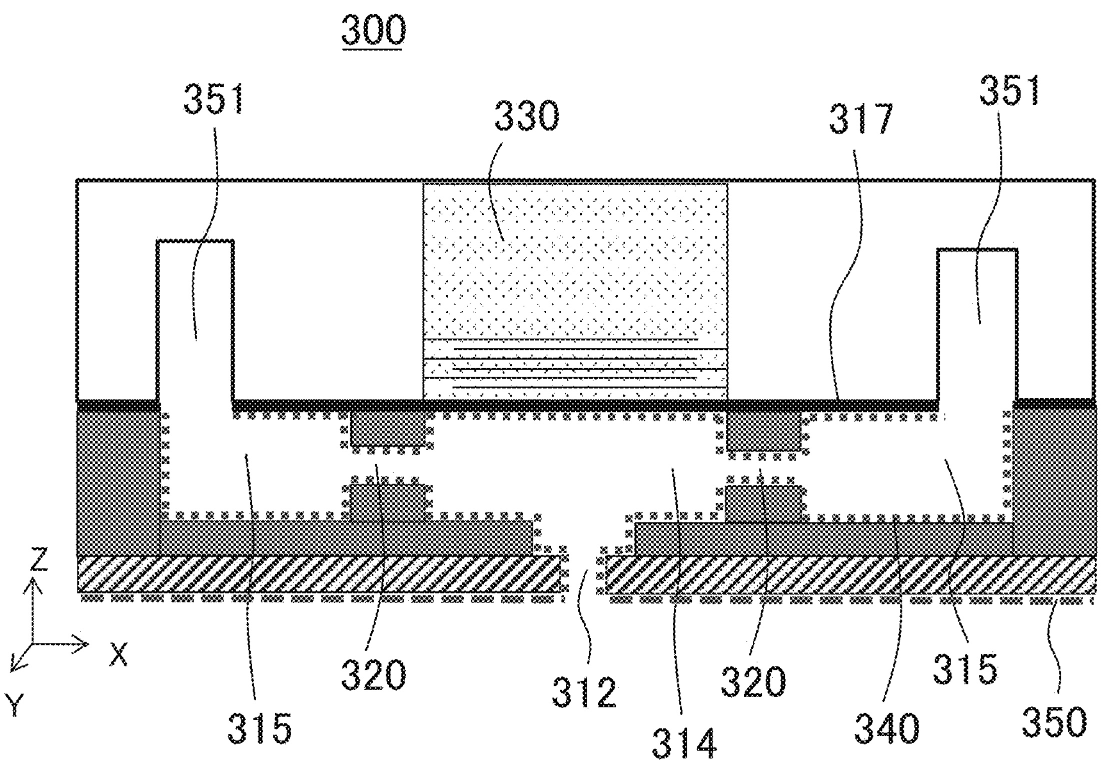
FIG. 4A is a schematic cross-sectional view illustrating a configuration of an ink-jet head according to an embodiment of the present disclosure.

FIG. 4A is a schematic cross-sectional view illustrating a configuration of ink-jet head 300 of the present embodiment. In addition. FIG. 4A is a cross-sectional view along AA' of FIG. 4C. FIG. 4B is a sectional view along XY of FIG. 4A. FIG. 4C is a plan view illustrating an arrangement of common channel 351 in the entire ink-jet head 300.

While the liquid discharging head is ink-jet head 300 that discharges ink in the present embodiment, this is not limitative. The liquid discharging head may discharge liquid other than ink.

Ink-jet head 300 includes nozzle 312, pressure chamber 314, piezoelectric element 330, diaphragm 317, narrow part 320, individual channel 315, common channel 351, monomolecular film 340, and liquid repellent film 350.

Nozzle 312 is a through hole for discharging ink, and is communicated with pressure chamber 314. The diameter of nozzle 312 is approximately 5 to 50 μm, for example. Nozzle 312 is formed by laser processing, etching, punching, or the like, for example.

Liquid repellent film 350 having a property for repelling ink (liquid repellency) is provided at the surface of nozzle 312. Liquid repellent film 350 is formed by spin coating with liquid of a liquid repellent raw material. With liquid repellent film 350 thus formed, the surface of nozzle 312 has liquid repellency. The receding contact angle of liquid repellent film 350 with respect to ink is 30 degrees or greater, for example. The static contact angle of liquid repellent film 350 with respect to ink is 50 degrees or greater, for example.

Piezoelectric element 330 (an example of an energy generation element) is provided in association with pressure chamber 314, and is displaced when a voltage is applied thereto. As piezoelectric element 330, a multilayer piezoelectric element of d33 mode or d31 mode, or a piezoelectric element that utilizes a shear mode may be used, for example. Instead of such piezoelectric elements, an electrostatic actuator, a heating element and the like may be used as the energy generation element.

Diaphragm 317 is disposed in contact with piezoelectric element 330, and is deformed when piezoelectric element 330 is displaced. For example, diaphragm 317 is composed of, but not limited to, a metal such as nickel or a resin such as polyimide. Preferably, the thickness of diaphragm 317 is 5 to 50 μm, for example.

When a displacement of piezoelectric element 330 is transmitted to diaphragm 317, diaphragm 317 is deformed. As a result, the volume of pressure chamber 314 is changed, and an ink droplet is discharged from nozzle 312. As such, the deformation amount of diaphragm 317 is very important, and the variation of the rigidity of diaphragm 317, which is associated with the deformation amount, affects the discharging characteristics, and therefore, it is desirable to make the rigidity of diaphragm 317 uniform.

Pressure chamber 314 is communicated with nozzle 312. In addition, pressure chamber 314 is communicated with individual channel 315 through narrow part 320. The volume of pressure chamber 314 is changed by the deformation of diaphragm 317. In accordance with the change of the volume, ink is discharged from nozzle 312. Depending on the volume of pressure chamber 314 and the channel resistance of narrow part 320, the resonance cycle of the ink changes, and the volume and rate of discharged ink change. In view of this, it is necessary to optimally adjust the volume of pressure chamber 314 and the like as necessary.

Individual channel 315, common channel 351, and narrow part 320 are channels for ink. Common channel 351 is communicated with individual channel 315. Individual channel 315 is communicated with pressure chamber 314 through narrow part 320. The width of narrow part 320 is smaller than that of individual channel 315. With this configuration, the pressure wave in pressure chamber 314 less escapes to individual channel 315.

Lyophilic monomolecular film 340 is formed at the inner walls of nozzle 312, pressure chamber 314, narrow part 320, diaphragm 317, and individual channel 315. Details of monomolecular film 340 are described later. In addition, monomolecular film 340 may be formed at the inner wall of common channel 351.

Nozzle 312, pressure chamber 314, individual channel 315, diaphragm 317, common channel 351, and narrow part 320 may be produced by heat diffusion bonding of a plurality of metal plates processed by etching, or by etching of silicon material, or the like, for example.

Monomolecular Film 340

As illustrated in FIG. 4A, monomolecular film 340 composed of an organic compound that is highly wettable (lyophilic property; hereafter referred to also as wettability) with ink is formed at the inner walls of nozzle 312, pressure chamber 314, narrow part 320, diaphragm 317, and individual channel 315.

The thickness of monomolecular film 340 is approximately 5 to 50 nm, for example.

Examples of the material of monomolecular film 340 include a material including a silanol group at the molecular end and multiple molecular chains with hydrophilic groups extending from the main backbone. Examples of such a material include a superhydrophilic coating material available from JUNSEI CHEMICAL CO., LTD. (specifically, LAMBIC-771W). As such, it can be said that monomolecular film 340 is a film whose material is molecules with a silanol group at the molecular end and multiple molecular chains with hydrophilic groups extending from the main backbone.

Here, the monomolecular film refers to a film in which molecules are aligned in the form of a thin film having a thickness that is worth one molecule. Note that the monomolecular film is referred to also as single molecular layer.

When higher fatty acid or higher alcohol dissolved in volatile solvent such as benzene is dropped to a water surface, a monomolecular film can be created after the solvent evaporates. At this time, the hydroxy group and the carboxy group (carboxyl group) of the alcohol are hydrophilic groups and are oriented to water, whereas the long-chain alkyl group of the hydrophobic group is oriented to the side (in air) away from the water. When molecules are arranged with no gap therebetween, a monomolecular film having a thickness that is exactly worth the length of the long-chain alkyl group (plus hydrophilic group) is obtained.

The material of monomolecular film 340 has a property in which molecules are aligned in a self-organizing manner, and an active silanol group adheres to the surface of the base material through a chemical reaction. A functional group for activating the silanol group is required to be present at the surface of the base material.

For example, it is desirable that at the surface of the base material, a silicon oxide film is formed such that a hydroxyl group comes out. Note that the film formed at the surface of the base material is not limited to a silicon oxide as long as a hydroxyl group comes out at the surface of the base material. For example, instead of silicon oxide, a metal oxide such as alumina ($Al_2O_3$) and titania ($TiO_2$) may be used. Monomolecular film 340 is provided to cover a silicon oxide film or a metal oxide film formed at the surface of the base material.

A surface to which a monomolecular film material can make chemisorption is predetermined, and therefore, after the monomolecular film material adheres to a surface, it does not three-dimensionally adhere to it. On the basis of this principle, a film of single molecule order is formed in a self-organizing manner. While the thickness is controlled at a very small value at 5 to 30 nm, the thickness is very important when the film is formed at the inner walls of nozzle 312 and pressure chamber 314. When coating agent or the like having a lyophilic property is used, the thickness is difficult to control, and the thickness of the orders of several micrometers to several tens of micrometers results. When the thickness is large, narrow part 320 and nozzle 312 are occupied by the lyophilic film, and clogging occurs. In addition, the thickness is very important also for the film formed at the surface of diaphragm 317. The reason for this is that the thickness of diaphragm 317 is approximately 10 μm, and therefore, when a film with a large thickness is attached on the surface of diaphragm 317, the rigidity of diaphragm 317 is largely changed, and the property of the oscillation transmitted from piezoelectric element 330 is largely changed. Note that the material of monomolecular film 340 is not limited to the above-described material as long as the material causes a reaction that achieves a film thickness of single molecule order in a self-organizing manner.

From the foregoing, it can be said that monomolecular film 340 is a self-organizing monomolecular film. A self-organizing monomolecular film can be formed by putting an appropriate material in organic molecular solution or steam to cause chemisorption of organic molecules to the material surface such that a monomolecular film having a thickness of 1 to 2 nm in which the orientations of organic molecules are aligned is formed in the course of the process. A self-organizing monomolecular film can be easily created by simply immersing a substrate in a solution of molecules having a functional group that binds to the substrate. In addition, a self-organizing monomolecular film has a high degree of orientation and a high stability, and can introduce various functions by the end functional groups. Note that the self-organizing monomolecular film is referred to also as a self-assembly monomolecular film.

Preferably, the receding contact angle of a film generated with the above-described self-organizing material is 20 degrees or smaller, or more preferably 15 degrees or smaller. In addition, preferably, the static contact angle is 25 degrees or greater, or more preferably 30 degrees or greater.

The receding contact angle and the static contact angle are described below.

When liquid is dropped to a solid surface, the liquid becomes spherical in shape by its own surface tension, and then the relationship of Expression (1) holds. Expression (1) is called Young expression.

$$\gamma s = \gamma L \times \cos\theta + \gamma SL \quad (1)$$

γs: Surface tension of solid

γL: Surface tension of liquid

γSL: Interfacial tension between solid and liquid

Here, angle θ between the tangent to the droplet and the solid surface is referred to as contact angle. Specifically, the contact angle in an equilibrium state where liquid is at rest on a solid surface is referred to as static contact angle.

On the other hand, the contact angle in a dynamic state where the interface between a liquid and a solid is moving, i.e., a state where the interface of the droplet is moving, is referred to as advancing contact angle or receding contact angle. Here, attention is focused on the receding contact angle, which is a dynamic contact angle of a state after a solid surface becomes wet with liquid.

The static contact angle of monomolecular film 340 illustrated in FIG. 4A with respect to ink is 30 degrees or greater. The receding contact angle of monomolecular film 340 illustrated in FIG. 4A with respect to ink is 20 degrees or smaller. This means the following.

The static contact angle of the case where nozzle 312, individual channel 315 and the like are in a dry state and ink first makes contact with monomolecular film 340 formed at their inner walls is 50 degrees or greater, which is a relatively high value.

As illustrated in FIG. 4A, no monomolecular film 340 is formed at the inner wall of common channel 351. Therefore, common channel 351 has a wettability of its material. In the case where the material of common channel 351 is stainless-steel, the static contact angle is 50 degrees or greater, for example.

In this case, there is substantially no difference in ink wettability between common channel 351 and individual channel 315. Thus, the ink is supplied to each channel without causing wetting failure such as mixing of bubbles in the ink flowing process.

When there is a significant difference in wettability between common channel 351 and individual channel 315 in the ink flowing process, the flow changes irregularly at the corresponding portion, and consequently bubbles may be mixed. The bubbles in the ink may often cause discharging failures, and it is therefore important to remove the bubbles in the ink as much as possible.

In the case where monomolecular film 340 is formed also at common channel 351, the static contact angle is not limited to the above-mentioned values, and may be 30 degrees or smaller.

On the other hand, the receding contact angle of monomolecular film 340 is as small as 20 degrees or smaller. After monomolecular film 340 becomes wet with ink, the hydrophilic groups in monomolecular film 340 spread, thus indicating a highly lyophilic property. At this time, the solvent component in the ink covers the inner wall surfaces of nozzle 312, pressure chamber 314, narrow part 320, and individual channel 315. In this state, the particles and binder in the ink flow without adhering to the inner walls since the inner walls are covered with the solvent so as not to allow their adhesion.

Figure 4B:
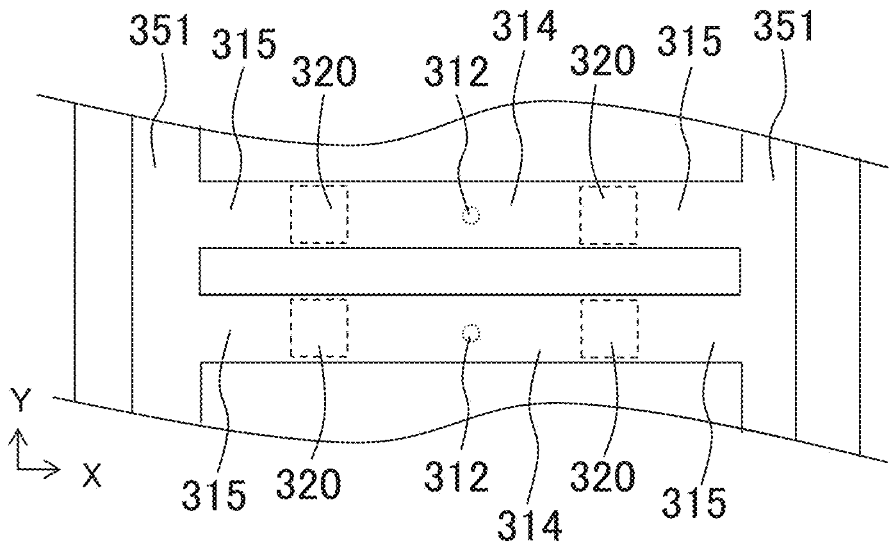
FIG. 4B is a sectional view along XY of FIG. 4A.

Note that while FIG. 4A illustrates only one nozzle 312 and the corresponding components (for example, pressure chamber 314, narrow part 320, individual channel 315, piezoelectric element 330 and the like), a plurality of nozzles 312 and the corresponding components are provided along the Y direction as illustrated in FIG. 4B.

As illustrated in FIG. 4B, common channel 351 is connected to each of a plurality of pressure chambers 314 through each individual channel 315 and each narrow part 320.

Common channel 351 is connected to an ink reservoir (not illustrated). The ink reservoir is connected to an ink supply tank (not illustrated) serving as the ink supply source. It can be said that the ink reservoir is a second ink supply tank between common channel 351 and the ink supply tank.

By pressurizing or depressurizing the ink reservoir, a pressure exerted on nozzle 312 can be controlled, and the ink can be discharged in an appropriate state.

Figure 4C:
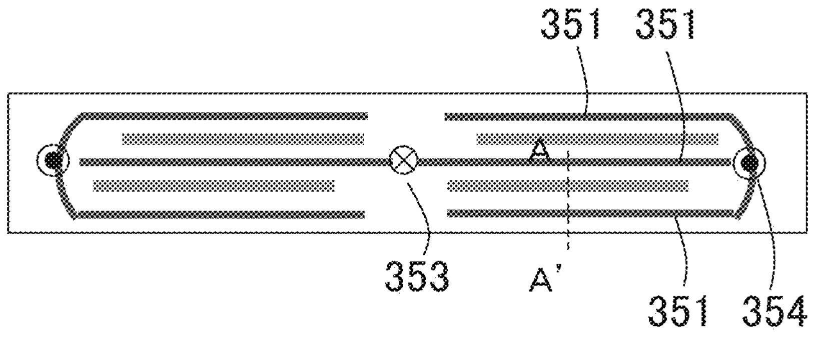
FIG. 4C is a plan view illustrating an arrangement of a common channel in the entire ink-jet head according to the embodiment of the present disclosure.

As illustrated in FIG. 4C, common channel 351 is communicated with inlet 353 and outlet 354. Ink flows from the ink reservoir into one common channel 351 through inlet 353, and flows from common channel 351 into each pressure chamber 314 through each individual channel 315 and each narrow part 320. The ink flowed into the other common channel 351 from each pressure chamber 314 is discharged from outlet 354. The discharged ink is collected in an ink collection tank connected to the ink supply tank, and again flows into the ink supply tank.

With the pressure difference provided between the ink supply tank and the ink collection tank, the ink flows from the ink collection tank to the ink supply tank. By employing such an ink circulation system, fresh ink can be supplied to each pressure chamber 314 at all times, and it is possible to prevent increase in viscosity due to evaporation of the solvent of the ink at a portion in contact with the atmosphere in the proximity of nozzle 312. In this manner, the ink can be stably discharged for long periods of time.

Ink-Jet Apparatus

The above-described ink-jet head 300 may be provided in an ink-jet apparatus. The ink-jet apparatus includes, for example, a drive controlling part and a conveying part, in addition to ink-jet head 300. The drive controlling part generates a drive voltage signal to be applied to piezoelectric element 330, and controls an ink discharging operation of ink-jet head 300. The conveying part causes a relative movement of ink-jet head 300 and a paint target medium (which may be referred to also as a printing target object) on which ink droplets impinge.

EVALUATION ON EXAMPLES AND COMPARATIVE EXAMPLES

Evaluation on Examples and Comparative Examples is described below.

The contact angle was evaluated based on a comparison between a case where monomolecular film 340 is formed on a stainless-steel plate and a case where monomolecular film 340 is not formed on a stainless-steel plate (Example 1 and Comparative Example 1 described later). The contact angle was measured using contact angle meter DSA100 (available from KRUSS).

In addition, the ink discharging property was evaluated based on a comparison between a case where monomolecular film 340 is formed at the inner walls of nozzle 312, pressure chamber 314, narrow part 320, diaphragm 317, and individual channel 315, and a case where monomolecular film 340 is not formed at the inner walls of nozzle 312, pressure chamber 314, narrow part 320, diaphragm 317, and individual channel 315 (Example 2 and Comparative Example 2 described later).

The evaluation was made in the following manner.

Ink was discharged from nozzle 312, and stroboscopic light was emitted in synchronization with application of the driving waveform to illuminate droplets of ink (hereinafter referred to as simply droplets) and to observe the droplets with a camera for observation of the flying process of the droplets. In addition, by delaying the emission timing of the stroboscopic light, the droplets were observed at different two time points, and the position coordinates of the droplets at the two points were measured to evaluate the angles of the fly directions of the droplets.

The ink used for the evaluation has a viscosity of 8 mPa-s, and a surface tension of 33 m N/m. The viscosity was measured using Viscometer AR-G2 (available from TA Instruments). The surface tension was measured using surface tension meter DSA100 (available from KRUSS). In addition, a binder material composed of an organic compound and a titanium oxide having a particle diameter of 1 μm was added in the ink used for the evaluation.

Example 1

In Example 1, first, a silicon oxide film having a thickness of approximately 20 nm was formed at a surface of a stainless-steel plate. The film was formed by an atomic layer vapor deposition method.

Next, the stainless-steel plate on which the silicon oxide film was formed was immersed in a liquid material (a superhydrophilic coating material available from JUNSEI CHEMICAL CO., LTD.; more specifically, LAMBIC-771W) serving as a raw material of monomolecular film 340, for approximately ten seconds. Thereafter, the stainless-steel plate after the immersion was dried using a heating furnace at 80° C. for 15 minutes, to thereby form monomolecular film 340.

Figure 5A:
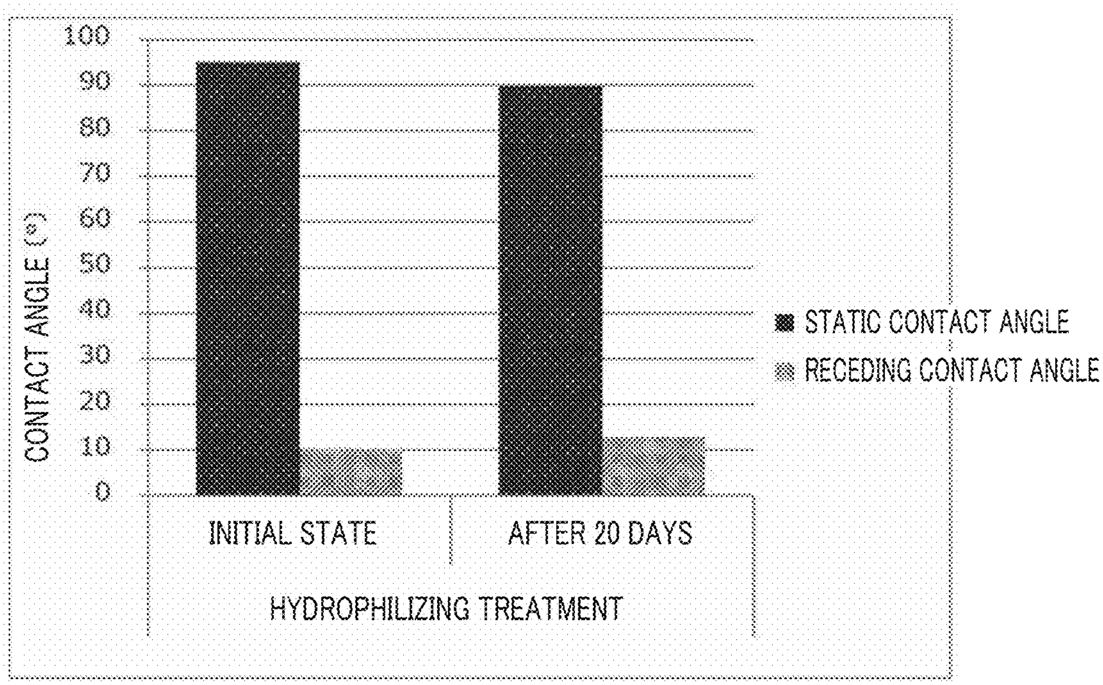
FIG. 5A shows an aging variation of the contact angle after a hydrophilizing treatment in Example 1.

Then, the aging variation of the contact angle with respect to the ink of the stainless-steel plate on which monomolecular film 340 was formed was evaluated. FIG. 5A shows results of the evaluation.

As shown in FIG. 5A, the static contact angle was 95 degrees at an initial state (when ink makes contact with it first), and the static contact angle was 90 degrees after immersion for 20 days in ink. In this manner, it was confirmed that almost no aging variation of the static contact angle was caused.

In addition, as shown in FIG. 5A, the receding contact angle was 10 degrees at an initial state, and the receding contact angle was 12 degrees after immersion for 20 days in ink. In this manner, it was confirmed that almost no aging variation of the receding contact angle was caused.

It is considered that, in Example 1, since monomolecular film 340 is formed on a stainless-steel plate, adhesion of the particles and binder in the ink was suppressed and the surface of the stainless-steel plate was stabilized.

Comparative Example 1

In Comparative Example 1, as in Example 1, a silicon oxide film having a thickness of approximately 20 nm was first formed at the surface of the stainless-steel plate by an atomic layer vapor deposition.

Figure 5B:
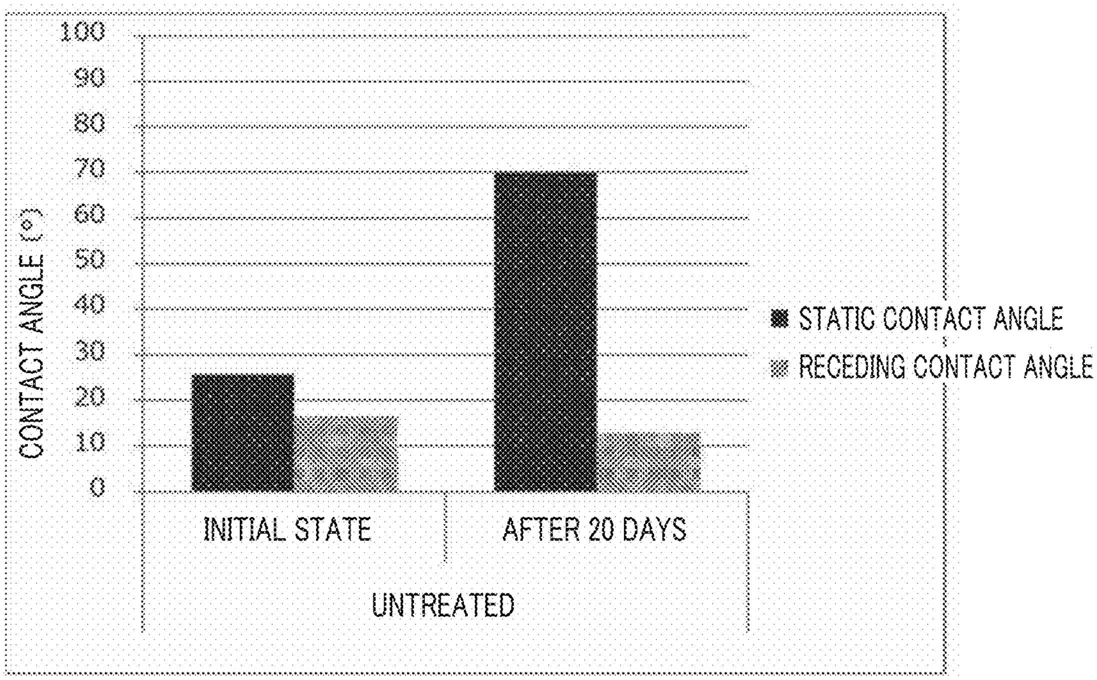
FIG. 5B shows an aging variation of the contact angle after a hydrophilizing treatment in Comparative Example 1.

Then, the aging variation of the contact angle, with respect to ink, of the stainless-steel plate on which only the silicon oxide film was formed was evaluated. FIG. 5B shows results of the evaluation.

As shown in FIG. 5B, the static contact angle was 25 degrees at an initial state whereas the static contact angle was 70 degrees after immersion for 20 days in ink, and thus, it was confirmed that the aging variation was significant.

In addition, as shown in FIG. 5B, the receding contact angle was 16 degrees at an initial state whereas the receding contact angle was 12 degrees after immersion for 20 days in ink.

It is considered that in Example 2, since monomolecular film 340 is not formed at the stainless-steel plate, the particles and binder in the ink adhered to the surface of the stainless-steel plate and the contact angle was significantly changed during the ink immersion.

Example 2

In Example 2, first, a silicon oxide film was formed by an atomic layer vapor deposition at the inner walls of nozzle 312, pressure chamber 314, narrow part 320, and individual channel 315. Here, the material of each of nozzle 312, pressure chamber 314, narrow part 320, diaphragm 317, and individual channel 315 is stainless-steel.

Next, monomolecular film 340 was formed at the inner walls of nozzle 312, pressure chamber 314, narrow part 320, diaphragm 317, and individual channel 315 by the same method as that of Example 1.

Then, the flying process was observed and the angle of the fly direction was evaluated for droplets discharged from nozzle 312 as described above.

Figure 6A:
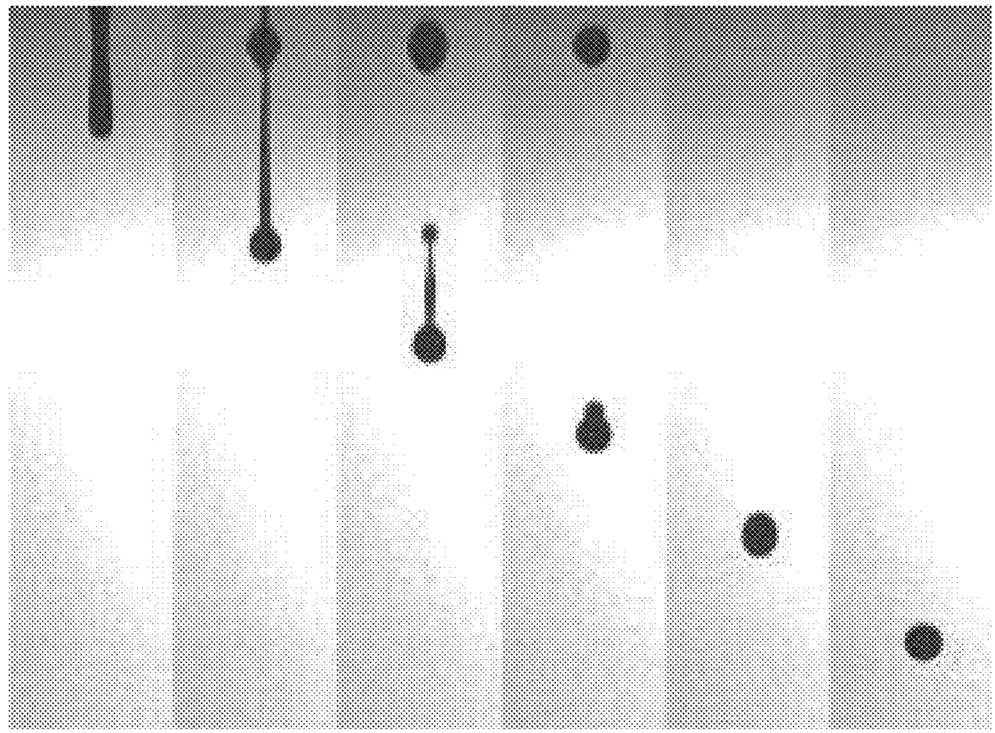
FIG. 6A shows a flying process of ink droplets in Example 2.

FIG. 6A shows a flying process of the droplets. As shown in FIG. 6A, it was observed that droplets jetted from nozzle 312 flew in such a manner as to extend in a columnar shape with a slender tail. In addition, it was confirmed that the droplet flew with the tail extending straight. Note that when the tail is curved, succeeding droplets also fly in a curved manner rather than flying straight and consequently the accuracy of the impinging position of the droplet is reduced. When the accuracy of the impinging position is reduced, the droplet cannot be applied to the targeted position, which may lead to reduction in printing quality.

Figure 6B:
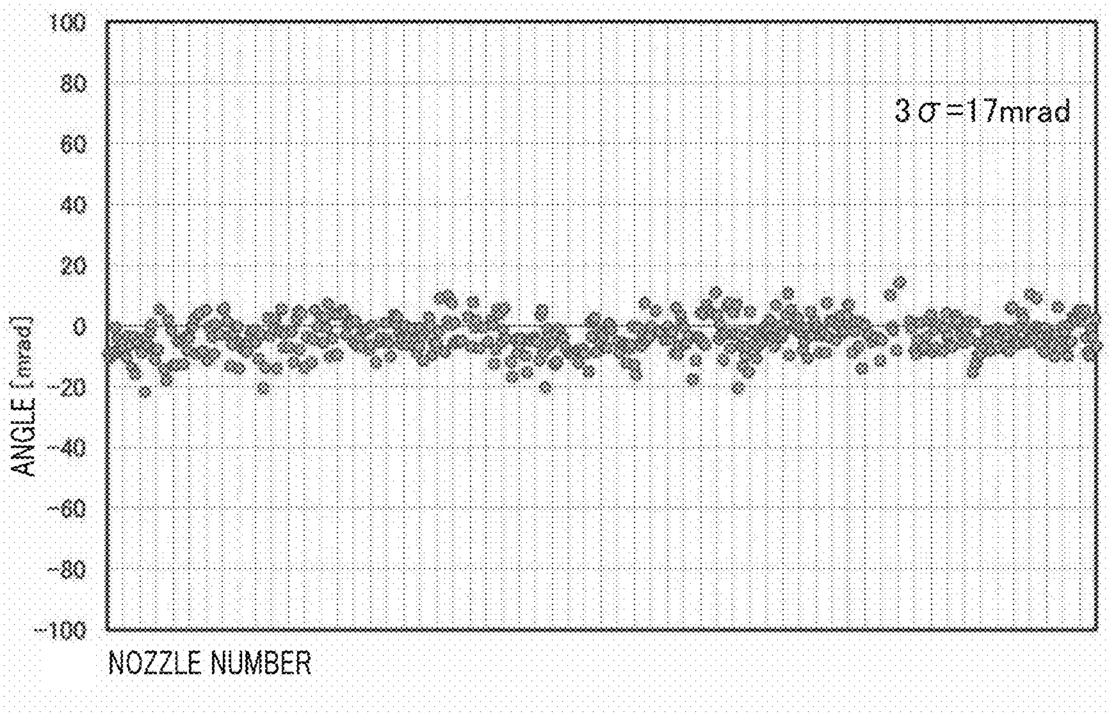
FIG. 6B shows fly angles of ink droplets in Example 2.

FIG. 6B shows fly angles of droplets discharged from a plurality of nozzles 312. In FIG. 6B, the abscissa indicates each nozzle, and the ordinate indicates fly angles of droplets. In FIG. 6B, the fly angle is 0 degree when a droplet flies straight with respect to the vertical direction of nozzle 312, and the greater the value of the fly angle, the higher the degree of the curve of the droplet.

The variation in the fly angles of the droplets discharged from hundreds of nozzles 312 was 17 mrad, when indicated as a value of a tripled standard deviation ($3\sigma$). This value means that the variation in the impinging positions of the droplets is 17 μm on the assumption that the distance between nozzle 312 and the printing target object is 1 mm.

The diameter of the impinging droplet was approximately 60 μm, and the ink was applied in such a manner that the semicircles of the droplets overlap each other. In this case, when the impinging positions are apart from each other by 30 μm or greater, a region where the applied droplets do not overlap each other is generated. In view of this, the target value of the accuracy of the impinging position is set to 30 μm or smaller. It was confirmed that in Example 2, the target value of the impinging position was achieved.

Comparative Example 2

In Comparative Example 2, first, a silicon oxide film was formed at the inner walls of nozzle 312, pressure chamber 314, narrow part 320, and individual channel 315 by an atomic layer vapor deposition as in Example 2. Here, the material of each of nozzle 312, pressure chamber 314, narrow part 320, diaphragm 317, and individual channel 315 is stainless-steel.

Then, the flying process was observed and the angle of the fly direction was evaluated for droplets discharged from nozzle 312 as described above.

Figure 7A:
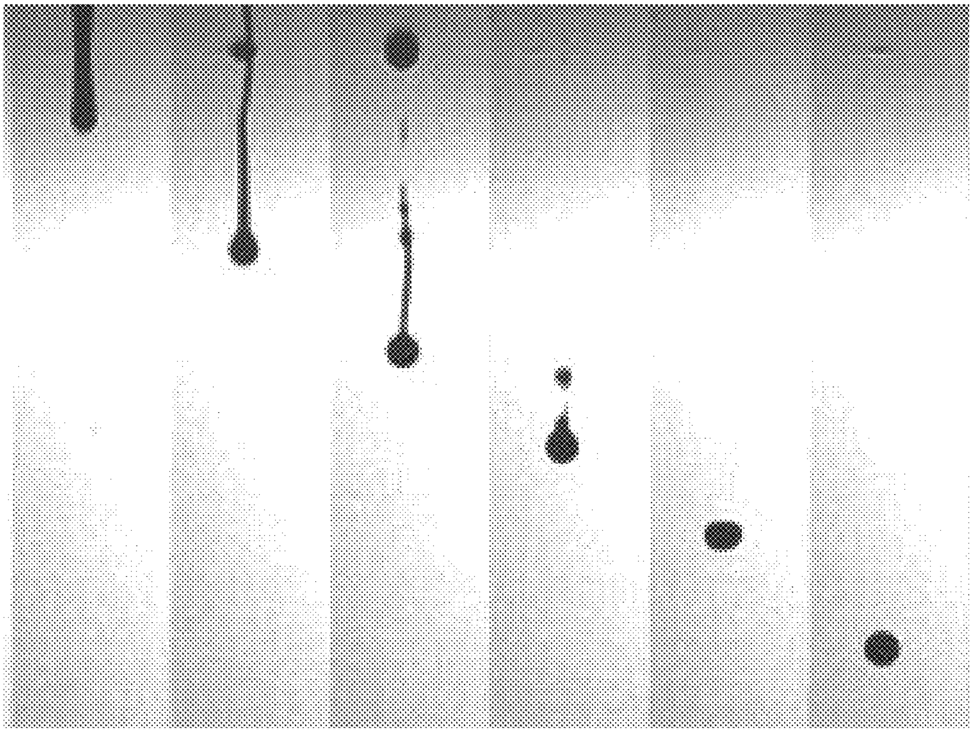
FIG. 7A shows a flying process of ink droplets in Comparative Example 2.

FIG. 7A shows a flying process of the droplets. As shown in FIG. 7A, it was observed that the droplets jetted from nozzle 312 flew in such a manner as to extend in a columnar shape with a slender tail. In addition, it was confirmed that the droplet flew with a curved tail. It is considered that the tail was curved due to the particles and binder in the ink adhered to the inner wall of nozzle 312. As described above, when the tail is curved, succeeding droplets also fly in a curved manner rather than flying straight and consequently the accuracy of the impinging position of the droplet is reduced. As a result, the droplet cannot be applied to the targeted position, which may lead to reduction in printing quality.

Figure 7B:
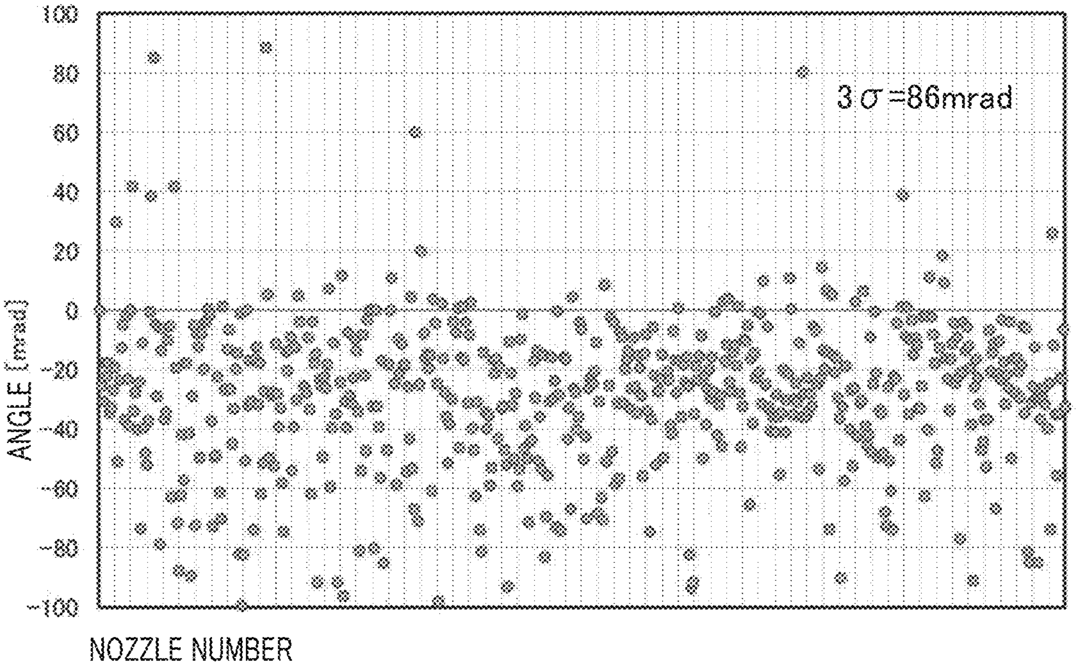
FIG. 7B shows fly angles of ink droplets in Comparative Example 2.

FIG. 7B shows fly angles of droplets discharged from a plurality of nozzles 312. The abscissa and the ordinate of FIG. 7B am the same as those of FIG. 6B. In addition, in FIG. 7B, the fly angle is 0 degree when a droplet flies straight with respect to the vertical direction of nozzle 312, and the greater the value of the fly angle, the higher the degree of the curve of the droplet as in FIG. 6B.

The variation in the fly angles of the droplets discharged from hundreds of nozzles 312 was 86 mrad in $3\sigma$. In this manner, it was confirmed that the variation in the fly angles of the droplets was very large. This value means that variation in the impinging positions of the droplets is 86 μm on the assumption that the distance between nozzle 312 and the printing target object is 1 mm. That is, droplets may unintentionally overlap each other or may not overlap each other while generating a blank, and consequently the printing quality may be reduced.

As described above, ink-jet head 300 of the present embodiment includes nozzle 312 configured to discharge liquid, pressure chamber 314 communicated with nozzle 312, individual channel 315 communicated with pressure chamber 314 through narrow part 320, common channel 351 communicated with individual channel 315, an energy generation element (for example, piezoelectric element 330) configured to generate energy, and diaphragm 317 configured to convey energy to pressure chamber 314. Monomolecular film 340 that is lyophilic to the liquid is formed at the inner walls of nozzle 312, pressure chamber 314, narrow part 320, diaphragm 317, and individual channel 315.

With this feature, at nozzle 312, pressure chamber 314, narrow part 320, diaphragm 317, and individual channel 315, adhesion of the particles and binder contained in the ink can be suppressed. Thus, clogging due to particles and/or binder can be suppressed, and stable discharging over time can be achieved. As a result, a high printing quality can be achieved.

The present disclosure is not limited to the above-described embodiments and various modifications may be made in so far as they are within the technical scope of the present disclosure.

INDUSTRIAL APPLICABILITY

The liquid discharging head and the ink-jet apparatus of the present disclosure are also useful for discharging inks such as white ink containing titanium oxide, conductive ink containing metal nano particles, quantum dot light emission ink containing quantum dot semiconductor particles, biological ink containing cells and the like, for example.

REFERENCE SIGNS LIST

51 Nozzle hole
60 Nozzle plate
61 Light energy
62 Heat energy
100 Nozzle

110 Pressure chamber
111 Partition wall
112 Diaphragm
130 Piezoelectric element
140 Piezoelectric member
200 Nozzle
210 Pressure chamber
212 Diaphragm
220 Thin-film piezoelectric element
230 Common pressure chamber
300 Ink-jet head
312 Nozzle
314 Pressure chamber
315 Individual channel
317 Diaphragm
320 Narrow part
330 Piezoelectric element
340 Monomolecular film
350 Liquid repellent film
351 Common channel
353 Inlet
354 Outlet

What is claimed is:

1. A liquid discharging head, comprising:

a nozzle configured to discharge liquid;

a pressure chamber communicated with the nozzle;

an individual channel communicated with the pressure chamber through a narrow part;

a common channel communicated with the individual channel;

an energy generation element configured to generate energy; and a diaphragm configured to convey the energy to the pressure chamber, wherein a metal oxide film is formed at each of an inner wall of the nozzle, an inner wall of the pressure chamber, an inner wall of the narrow part, an inner wall of the diaphragm, and an inner wall of the individual channel, and a hydroxyl group has come out from the metal oxide film.

2. The liquid discharging head according to claim 1, further comprising:

a hydrophilic film, wherein the hydrophilic film covers the metal oxide film.

3. The liquid discharging head according to claim 2, wherein the hydrophilic film is a monomolecular film.

4. The liquid discharging head according to claim 3, wherein the monomolecular film is a self-organizing monomolecular film.

5. The liquid discharging head according to claim 3, wherein the monomolecular film has a thickness of 50 nm or smaller.

6. The liquid discharging head according to claim 1, wherein the inner walls of the nozzle, the pressure chamber, the narrow part, and the individual channel have a static contact angle greater than a receding contact angle with respect to the liquid.

7. The liquid discharging head according to claim 1, wherein an outer surface of the nozzle has a liquid repellency to the liquid.

8. The liquid discharging head according to claim 7, wherein the outer surface of the nozzle has a receding contact angle of 30 degrees or greater with respect to the liquid.

9. An ink-jet apparatus, comprising:

the liquid discharging head according to claim 1;

a drive controlling part configured to generate a drive voltage signal to be applied to the energy generation element and to control an ink discharging operation of the liquid discharging head; and a conveying part configured to cause a relative movement of the liquid discharging head and a paint target medium.

10. A method for producing a liquid discharging head, wherein the liquid discharging head includes:

a nozzle configured to discharge liquid;

a pressure chamber communicated with the nozzle;

an individual channel communicated with the pressure chamber through a narrow part;

a common channel communicated with the individual channel;

an energy generation element configured to generate energy; and a diaphragm configured to convey the energy to the pressure chamber, the method comprising:

forming a metal oxide film at each of an inner wall of the nozzle, an inner wall of the pressure chamber, an inner wall of the narrow part, an inner wall of the diaphragm, and an inner wall of the individual channel, wherein a hydroxyl group has come out from the metal oxide film.

* * * * *